US012802883B2

(12) United States Patent
Hwang et al.

(10) Patent No.: US 12,802,883 B2
(45) Date of Patent: Nov. 17, 2026

(54) MULTILAYER CAPACITOR

(71) Applicant: SAMSUNG ELECTRO-MECHANICS CO., LTD., Suwon-si (KR)

(72) Inventors: Hyunjun Hwang, Suwon-si (KR); Jinkyung Park, Suwon-si (KR); Changsoo Jang, Suwon-si (KR); Munseong Jeong, Suwon-si (KR); Won Seok Jang, Suwon-si (KR); Nayoung Kim, Suwon-si (KR); Jungmin Kim, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 194 days.

(21) Appl. No.: 18/770,257

(22) Filed: Jul. 11, 2024

(65) Prior Publication Data

US 2025/0210267 A1 Jun. 26, 2025

(30) Foreign Application Priority Data

Dec. 21, 2023 (KR) ........................ 10-2023-0188325

(51) Int. Cl.
*H01G 4/12* (2006.01)
*H01G 4/008* (2006.01)
*H01G 4/30* (2006.01)

(52) U.S. Cl.
CPC ......... *H01G 4/1245* (2013.01); *H01G 4/0085* (2013.01); *H01G 4/30* (2013.01)

(58) Field of Classification Search
CPC ....... H01G 4/1245; H01G 4/0085; H01G 4/30
See application file for complete search history.

(56) References Cited

U.S. PATENT DOCUMENTS

2011/0031448 A1* 2/2011 Ota ........................... B22F 1/00 252/512
2017/0025222 A1 1/2017 Park et al.
2019/0237264 A1 8/2019 Sakurai et al.
2022/0285094 A1* 9/2022 Matsumoto .............. H01G 4/30
2023/0071865 A1* 3/2023 Oh .......................... B22F 7/062

FOREIGN PATENT DOCUMENTS

JP 2019-134098 A 8/2019
KR 10-2017-0012686 A 2/2017
KR 10-2022-0125164 A 9/2022

OTHER PUBLICATIONS

S. L. Lai et al., "Size-Dependent Melting Properties of Small Tin Particles: Nanocalorimetric Measurements," Phys. Rev., Lett. 77, No. 1., 1996, p. 99-102.
J. Zhang et al., "Coating of Crystalline BaTiO3 Layer on Ni Nanoparticles for Multilayer Ceramic Capacitor Electrode," Adv. Eng. Mater., 2020, No. 22, 1901483.

* cited by examiner

*Primary Examiner* — Michael P Mcfadden
(74) *Attorney, Agent, or Firm* — Morgan, Lewis & Bockius LLP

(57) ABSTRACT

A multilayer capacitor may include a capacitor body including a dielectric layer and an internal electrode, and an external electrode disposed outside the capacitor body, where the internal electrode and the dielectric layer may include zirconium (Zr), and where an average content of zirconium (Zr) with respect to the entire internal electrode may be 0.0005 mol % or more and less than 5.0 mol %.

16 Claims, 8 Drawing Sheets

MULTILAYER CAPACITOR

CROSS-REFERENCE TO RELATED APPLICATION

This application claims priority to and the benefit of Korean Patent Application No. 10-2023-0188325 filed in the Korean Intellectual Property Office on Dec. 21, 2023, the entire contents of which is incorporated herein by reference.

BACKGROUND

The present disclosure relates to a multilayer capacitor.

Recently, as electronic devices have rapidly become multifunctional and down-sized, electronic parts also have rapidly been down-sized and improved in performance. In addition, high reliability of the electric devices used in automobiles, network equipment, or the like and the electronic parts for industrial use have been increasingly greatly required.

In order to meet such market demands, competition for technology development of passive parts such as inductors, capacitors, or resistors is being accelerating. In particular, required are lots of efforts to preoccupy the market by developing various products of multilayer Ceramic capacitors (MLCC), which are the passive parts and whose use and usage are continuously increasing.

In addition, the multilayer capacitors are manufactured by stacking dielectric layers and internal electrodes and used in various electronic devices such as mobile phones, laptops, LCD TVs, and the like.

With recent technological advancements, multilayer capacitors are required to be miniaturized and have high capacities, and to this end, technologies are being developed to increase the effective electrode area by increasing the connectivity of the internal electrodes in contact with the dielectric layer, or to atomize the dielectric material and internal electrode material.

However, when the material is atomized, the melting point decreases, which may decrease the material's heat shrinkage initiation temperature. In particular, in the case of the metal material included in the internal electrode, the rate of decrease in heat shrinkage initiation temperature is higher than that of the ceramic material included in the dielectric layer, so the difference in heat shrinkage temperature between the dielectric layer and the internal electrode increases.

The larger the difference in heat shrinkage temperature between the dielectric layer and the internal electrode, the greater the possibility that electrode connectivity will deteriorate after firing the dielectric layer and the internal electrode, and the electrical capacity and reliability of the multilayer capacitor may deteriorate.

Currently, in order to reduce the difference in heat shrinkage temperature between the dielectric layer and the internal electrode, a method of adding nano-sized barium titanate ($BaTiO_3$) co-material is used when manufacturing the internal electrode.

However, when the content of the barium titanate vacancy increases, the film density of the internal electrode decreases, and the co-material diffused into the dielectric layer during the firing process increases the thickness of the dielectric layer, resulting in the side effect of decreasing the capacity of the capacitor. Accordingly, the development of new co-materials with high thermal stability is required.

SUMMARY

The present disclosure attempts to provide a multilayer capacitor with improved electrode connectivity and excellent electrical characteristics and reliability.

However, the problems to be solved by embodiments are not limited to the above-described problem and may be variously extended in a range of technical ideas included in embodiments.

A multilayer capacitor may include a capacitor body including a dielectric layer and an internal electrode, and an external electrode disposed outside the capacitor body, where the internal electrode and the dielectric layer may include zirconium (Zr), and where an average content of zirconium (Zr) with respect to the entire components in the internal electrode may be 0.0005 mol % or more and less than 5.0 mol %.

The internal electrode may include a conductive metal and zirconium (Zr).

The dielectric layer may include a primary component and a secondary component, and the primary component may include $(Ba_{1-x}Ca_x)_m(Ti_{1-y}Zr_y)O_3$ ($0.995 \leq m \leq 1.010$, $0 \leq x \leq 0.10$, $0 < y \leq 0.20$), $Ba_m(Ti_{1-x}Zr_x)O_3$ ($0.995 \leq m \leq 1.010$, $x \leq 0.10$), or a combination thereof.

The average content of zirconium (Zr) with respect to the entire internal electrode may be 0.001 mol % to 1.0 mol %.

The dielectric layer may include a central portion of the dielectric layer in a thickness direction and an interface portion of the dielectric layer located on both surfaces of the central portion of the dielectric layer and contacting the internal electrode, the average content of zirconium (Zr) with respect to the entire components of the interface portion of the dielectric layer may be 0.001 mol % to 10.0 mol %, and the average content of zirconium (Zr) with respect to the entire the central portion of the dielectric layer may be 0 mol % to 2.0 mol %.

The dielectric layer may include a plurality of dielectric grains, the dielectric grain may include a first dielectric grain located in the interface portion of the dielectric layer and a second dielectric grain located in the central portion of the dielectric layer, and an average particle diameter of the first dielectric grain may be smaller than an average particle diameter of the second dielectric grain.

The average particle diameter of the first dielectric grain may be 50 nm to 200 nm, and the average particle diameter of the second dielectric grain may be 150 nm to 500 nm.

An average thickness of the dielectric layer may be 0.1 μm to 5 μm.

An average thickness of the internal electrode may be 0.1 μm to 2 μm.

A multilayer capacitor may include a capacitor body including a dielectric layer and an internal electrode, and an external electrode disposed outside the capacitor body, where the internal electrode may include a conductive metal and zirconium (Zr), where the dielectric layer may include $(Ba_{1-x}Ca_x)_m(Ti_{1-y}Zr_y)O_3$ ($0.995 \leq m \leq 1.010$, $0 \leq x \leq 0.10$, $0 < y \leq 0.20$), $Ba_m(Ti_{1-x}Zr_x)O_3$ ($0.995 \leq m \leq 1.010$, $x \leq 0.10$), or a combination thereof, and where an average content of zirconium (Zr) with respect to the entire internal electrode may be 0.0005 mol % or more and less than 5.0 mol %.

The average content of zirconium (Zr) with respect to the entire internal electrode may be 0.001 mol % to 1.0 mol %.

The dielectric layer may include a central portion of the dielectric layer and an interface portion of the dielectric layer located on a surface of the central portion of the dielectric layer and contacting the internal electrode, the average content of zirconium (Zr) with respect to the entire the interface portion of the dielectric layer may be 0.001 mol % to 10.0 mol %, and the average content of zirconium (Zr) with respect to the entire the central portion of the dielectric layer may be 0 mol % to 2.0 mol %.

The dielectric layer may include a plurality of dielectric grains, the dielectric grain may include first dielectric grain located in the interface portion of the dielectric layer and a second dielectric grain located in the central portion of the dielectric layer, and an average particle diameter of the first dielectric grain may be smaller than an average particle diameter of the second dielectric grain.

The average particle diameter of the first dielectric grain may be 50 nm to 200 nm, and the average particle diameter of the second dielectric grain may be 150 nm to 500 nm.

An average thickness of the dielectric layer may be 0.1 μm to 5 μm.

An average thickness of the internal electrode may be 0.1 μm to 2 μm.

According to a multilayer capacitor according to embodiment, the advantage of improved electrode connectivity and excellent electrical characteristics and reliability may be achieved.

The various beneficial advantages and effects of the present disclosure are not limited to the above description, and will be more easily understood in the process of describing specific embodiments of the present disclosure.

DETAILED DESCRIPTION OF THE EMBODIMENTS

Figure 1:
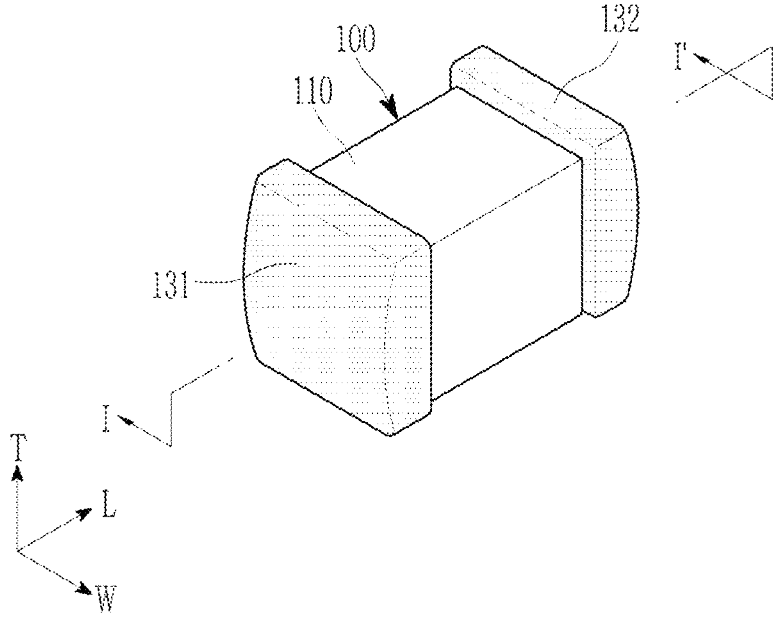
FIG. 1 is a perspective view showing a multilayer capacitor according to an embodiment.

Embodiments of the present disclosure will be described more fully hereinafter with reference to the accompanying drawings, in which embodiments of the disclosure are shown. The drawings and description are to be regarded as illustrative in nature and not restrictive. Like reference numerals designate like elements throughout the specification. Further, the accompanying drawings are provided only in order to allow embodiments disclosed in the present specification to be easily understood, and are not to be interpreted as limiting the spirit disclosed in the present specification, and it is to be understood that the present disclosure includes all modifications, equivalents, and substitutions without departing from the scope and spirit of the present disclosure.

Although terms of "first," "second," and the like are used to explain various components, the components are not limited to such terms. These terms are only used to distinguish one component from another component.

When it is mentioned that a certain component is "coupled with" or "connected with" another component, it may be understood that another component can exist between the two components although the component can be directly coupled or connected with another component. Meanwhile, when it is mentioned that a certain component is "directly coupled with" or "directly connected with" another component, it has to be understood that another component does not exist between the two components.

Throughout the specification, the terms "comprise" or "have" are intended to specify the presence of stated features, integers, steps, operations, components, components or a combination thereof, but do not preclude the presence or addition of one or more other features, integers, steps, operations, components, components, and/or groups thereof. Therefore, unless explicitly described to the contrary, the word "comprise" and variations such as "comprises" or "comprising" will be understood to imply the inclusion of stated elements but not the exclusion of any other elements.

Figure 2:
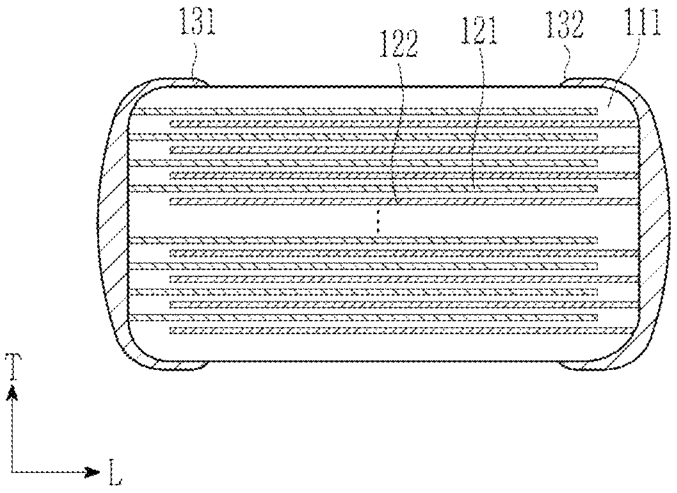
FIG. 2 is a cross-sectional view of a multilayer capacitor taken along line I-I' of FIG. 1.
Figure 3:
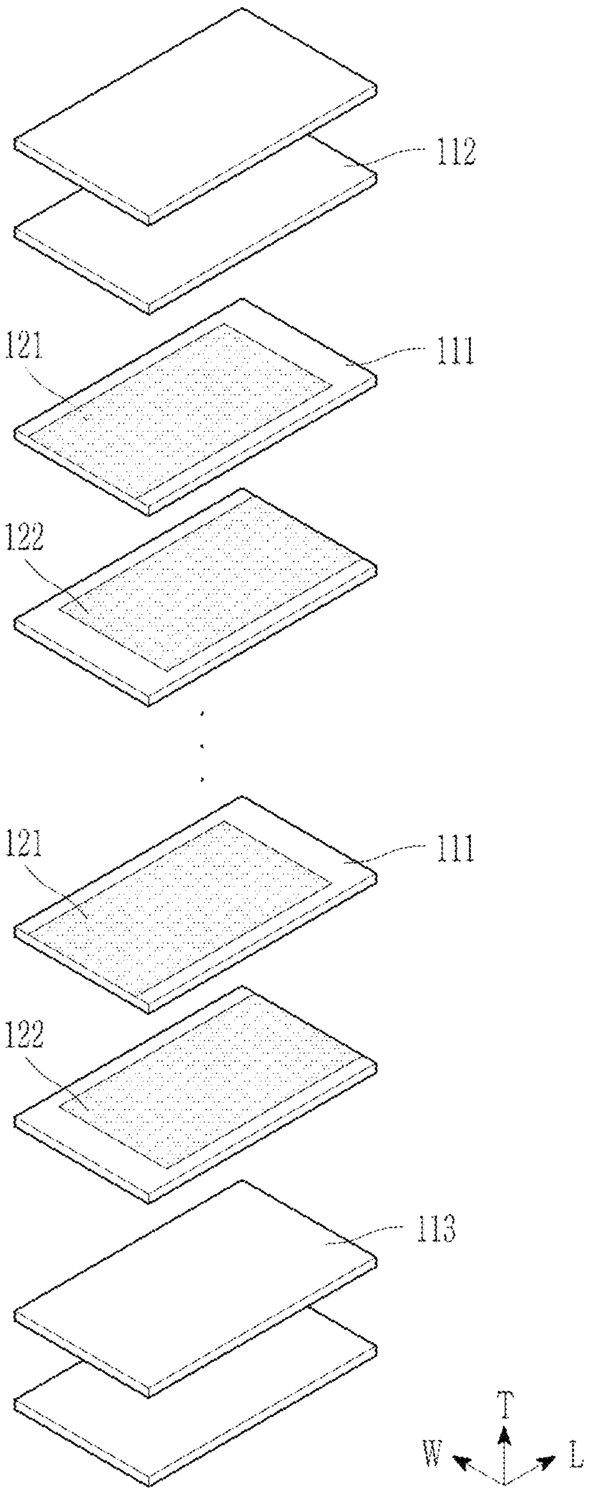
FIG. 3 is an exploded perspective view showing a stacking structure of an internal electrode layer in the capacitor body of FIG. 1.

FIG. 1 is a perspective view showing a multilayer capacitor 100 according to an embodiment. FIG. 2 is a cross-sectional view of the multilayer capacitor 100 taken along line I-I' of FIG. 1. FIG. 3 is an exploded perspective view showing a stacking structure of an internal electrode in a capacitor body 110 of FIG. 1.

When directions are defined to clearly describe the present embodiment, the L-axis, W-axis, and T-axis indicated in the drawings represent the length direction, the width direction, and the thickness direction of the capacitor body 110, respectively. Herein, the thickness direction (the T-axis direction) may be a direction perpendicular to the wide surface (major surface) of the sheet-shaped components, and may be, for example, used in the same concept as the stacking direction in which the dielectric layers 111 are stacked. The length direction (L-axis direction) may be a direction substantially perpendicular to the thickness direction (the T-axis direction) in a direction extending parallel to the wide surface (major surface) of the sheet-shaped components, and may be, for example, a direction in which the first and second external electrodes 131 and 132 are disposed. The width direction (W-axis direction) may be a direction that extends parallel to the wide surface (major surface) of the sheet-shaped components and is substantially perpendicular to the thickness direction (the T-axis direction), and the length of the sheet-like components in the length direction (L-axis direction) may be longer than the length in the width direction (W-axis direction).

Referring to FIG. 1 to FIG. 3, the multilayer capacitor 100 according to some embodiments may include the capacitor body 110, and first and second external electrodes 131 and 132 disposed at both ends of the capacitor body 110 which face each other in the length direction (L-axis direction).

The capacitor body 110 may have, for example, a substantially hexahedral shape.

In this embodiment, for convenience of explanation, in the capacitor body 110, surfaces opposite to each other in the thickness direction (the T-axis direction) are defined as first and second surfaces, surfaces connected to the first and second surfaces and facing each other in the length direction (L-axis direction) are defined as third and fourth surfaces, and surfaces connected to the first and second surfaces, connected to the third and fourth surfaces, and facing each other in the width direction (W-axis direction) are defined as fifth and sixth surfaces.

For example, the first surface, which is a lower surface, may be a surface facing a mounting direction. In addition, the first to sixth surfaces may be flat, but the present embodiment is not limited thereto, for example, the first to sixth surfaces may be curved surfaces with a convex central portion, and an edge of each surface which is a boundary, may be round.

The shape and dimensions of the capacitor body 110 and the number of stacked dielectric layers 111 are not limited to those shown in the drawings of the present embodiment.

The capacitor body 110 may be formed by stacking a plurality of dielectric layers 111 in the thickness direction (the T-axis direction) and then firing them, and may include a plurality of dielectric layers 111, and the first and second internal electrode layers 121 and 122 which are alternately disposed in a thickness direction (the T-axis direction) with the dielectric layers 111 interposed therebetween.

Herein, the boundary between the respective dielectric layers 111 adjacent to each other of the capacitor body 110 may be integrated to the extent that it is difficult to check without using a scanning electron microscope (SEM).

Also, the capacitor body 110 may include an active region and cover regions 112 and 113.

The active region contributes to generating a capacitance of the multilayer capacitor 100. For example, the active region may be a region in which the first and second internal electrode layers 121 and 122 are stacked and overlapped with each other along the thickness direction (the T-axis direction).

The cover regions 112 and 113 may be respectively disposed on the first and second surfaces of the active region in the thickness direction (the T-axis direction) as thickness-direction margin portions. The cover regions 112 and 113 may be formed by stacking a single dielectric layer 111 or two or more dielectric layers 111 on an upper surface and a lower surface of the active region, respectively.

In addition, the capacitor body 110 may further include a side cover region. The side cover region is a margin portion, and may be respectively disposed on the fifth and sixth surfaces of the active region in the width direction (W-axis direction). Such a side cover region may be formed by coating a conductive paste layer for forming an internal electrode layer only on a portion of the surface of the dielectric green sheet, stacking dielectric green sheets on which a conductive paste layer is not coated on both side surfaces of the dielectric green sheet, and firing the same.

The cover regions 112 and 113 and the side cover regions serve to prevent damage to the first and second internal electrode layers 121 and 122 due to physical or chemical stress.

Internal Electrode

The first and second internal electrodes 121 and 122 are electrodes having different polarities, and are alternately disposed to face each other along the thickness direction with the dielectric layer 111 interposed therebetween, and one end thereof may be exposed through the third and fourth surfaces of the capacitor body 110.

The first and second internal electrodes 121 and 122 may be electrically insulated from each other by the dielectric layer 111 disposed therebetween.

Ends of the first and second internal electrodes 121 and 122 alternately exposed through the third and fourth surfaces of the capacitor body 110 are connected to the first and second external electrodes 131 and 132, respectively, to be electrically connected.

Internal electrodes 121 and 122 may include zirconium (Zr), and as an example, may include a conductive metal and zirconium (Zr), and may include an alloy of a conductive metal and zirconium (Zr).

Zirconium (Zr) may be added to a conductive paste for the internal electrode in the form of Zr oxide ($ZrO_2$), and after the firing process, the internal electrodes 121 and 122 may include Zr oxide ($ZrO_2$), Zr, or a combination thereof.

Since Zr oxide ($ZrO_2$) has a melting point of approximately 1100° C. higher than that of barium titanate ($BaTiO_3$), which is commonly used co-material, when Zr oxide is included in the conductive paste for the internal electrode and fired, the effect of delaying heat shrinkage of the internal electrode delay effect is superbly excellent compared to the case of using barium titanate. Accordingly, the thermal stability of the internal electrode is increased, and the electrode connectivity of the internal electrode may be significantly improved.

According to some embodiments, the conductive metal may further include, for example, a metal such as Ni, Cu, Ag, Pd, or Au, or an alloy thereof, for example, Ag—Pd alloy. For example, when the conductive metal includes Ni, the first internal electrode 121 and the second internal electrode 122 may include Ni and Zr, and for example, Ni—Zr alloy.

Also, the first and second internal electrodes 121 and 122 may include dielectric particles having the same composition as the ceramic material included in the dielectric layer 111.

The first and second internal electrodes 121 and 122 may be formed using a conductive paste containing a conductive metal. As a method of printing the conductive paste, a screen-printing method or a gravure printing method or the like may be used.

According to some embodiments, the average content of zirconium (Zr) with respect to the entire components in the internal electrodes 121 and 122 is 0.0005 mol % or more and less than 5.0 mol %.

According to some embodiments, the average content of zirconium (Zr) with respect to the entire the internal electrodes 121 and 122 may be 0.0005 mol % or more or 0.001 mol % or more, and may be less than 5.0 mol %, 2.5 mol % or less, or 1.0 mol % or less.

According to some embodiments, the average content of zirconium (Zr) with respect to the entire internal electrodes 121 and 122 may be 0.0005 mol % to 2.5 mol %, and for example, may be 0.001 mol % to 2.5 mol %, or 0.001 mol % to 1.0 mol %.

When the average content of zirconium (Zr) in the internal electrodes 121 and 122 is less than 0.0005 mol %, the effect of improving the electrode connectivity may be minimal, and when it is 5 mol % or more, the electric characteristics and reliability of the capacitor may deteriorate.

Figure 4:
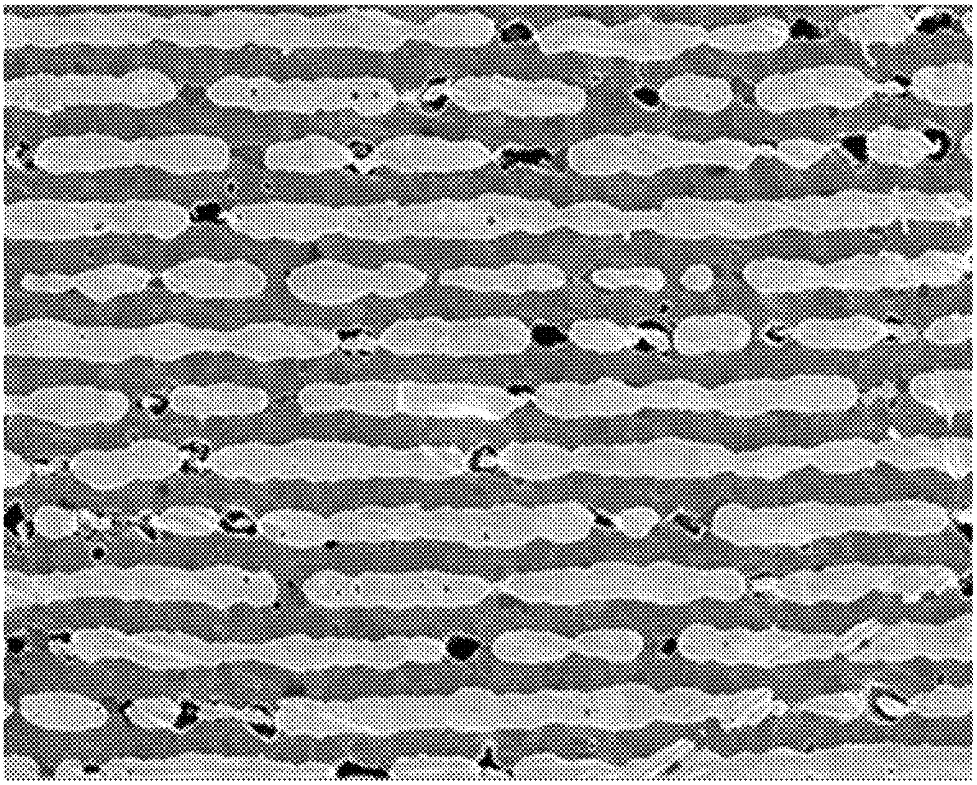
FIG. 4 is a TEM image of a portion of a cross-section of a multilayer capacitor according to an embodiment.

FIG. 4 is a TEM image of a portion of a cross-section of a multilayer capacitor according to an embodiment.

Figure 5:
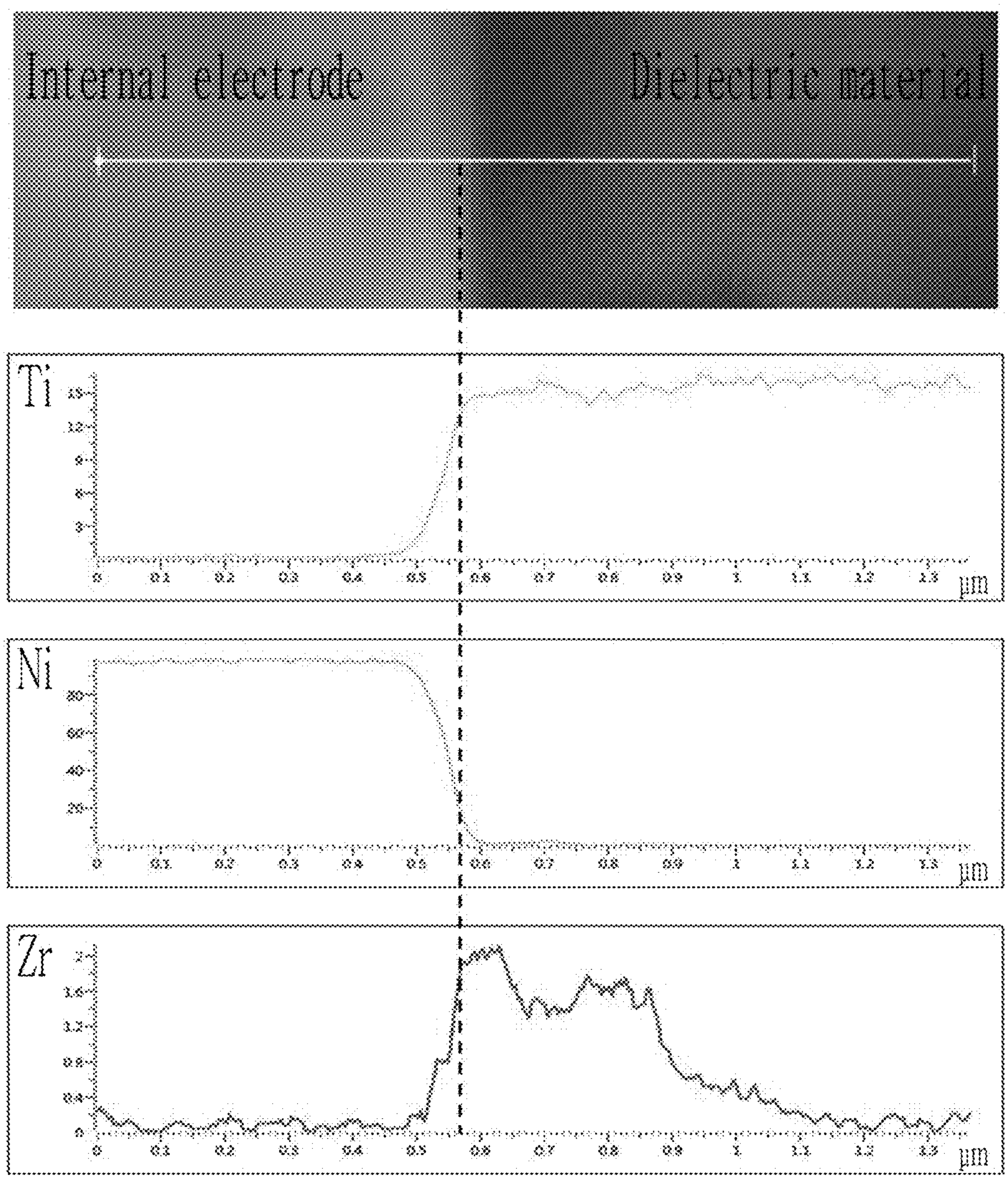
FIG. 5 and FIG. 6 is a graph showing a result of line analysis of Ti, Ni, and Zr contents by TEM-EDS according to locations of dielectric layer and internal electrode.
Figure 6:
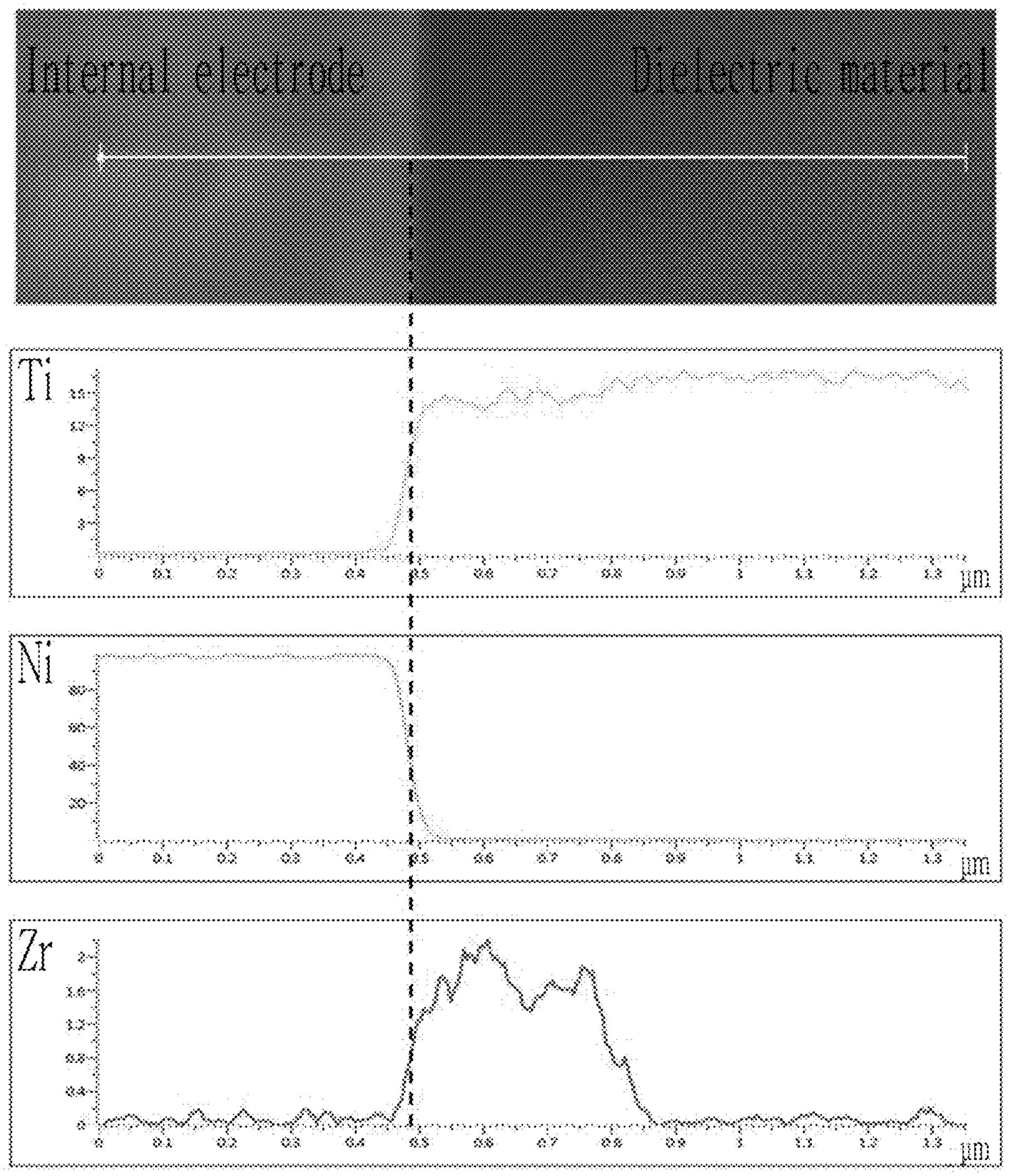

FIG. 5 and FIG. 6 are graphs showing a result of line analysis of Ti, Ni, and Zr contents by TEM-EDS according to locations of dielectric layer and internal electrode.

Referring to FIG. 4 to FIG. 6, the average content of zirconium (Zr) (mol %) in the internal electrodes 121 and 122 may be measured by the following method.

First, after the multilayer capacitor 100 is placed into the epoxy mixture liquid and then cured, side surfaces of the capacitor body 110 in the W-axis direction and the T-axis direction are polished to the point of ½ in the L-axis direction, fixed and maintained in the vacuum atmosphere chamber, and thereby a cross-sectional sample (hereinafter, referred to as a "cross-sectional sample") that is cut in the W-axis direction and the T-axis direction at the center of the capacitor body 110 in the L-axis direction was prepared.

Then, by observing the cross-sectional sample with the transmission electron microscope (TEM), a TEM image as shown in FIG. 4 was prepared.

Subsequently, a by mapping the TEM image of cross-sectional sample to the Zr component, it may be confirmed that Zr is detected from the cross-sectional sample, and the location where Zr is distributed may be confirmed.

Then, by performing a line-profile analysis by using the energy dispersive X-ray spectrometer (EDS) installed in the transmission electron microscope (TEM), the Zr content according to the distributed location is measured.

Referring to FIG. 5 and FIG. 6, Zr and its content present on the internal electrode side may be confirmed, and by performing the line-profile analysis at least two points and obtaining an arithmetic average, the average Zr content included in the internal electrode may be derived.

According to some embodiments, an average thickness of the first internal electrode 121 and the second internal electrode 122 may be 0.1 μm, 0.2 μm or more, or 0.25 μm or more, and may be 2.0 μm or less, 1 μm or less, 0.5 μm or less.

The average thickness of the internal electrodes 121 and 122 may be measured by the following method.

The average thickness of the internal electrode may be obtained, in the scanning electron microscope (SEM) image of the cross-sectional sample, by taking an arithmetic mean of the thicknesses of the first internal electrode 121 or the second internal electrode 122 at 10 points spaced apart with a predetermined interval from a reference point, which is a central point in the L-axis direction or the W-axis direction of the first internal electrodes 121 and 122.

The predetermined interval of the 10 points may be adjusted according to a scale of the scanning electron microscope (SEM) image, for example, 1 μm to 100 μm, 1 μm to 50 μm, or 1 μm to 10 μm.

Herein, the 10 points must be al located within the first internal electrode 121 or the second internal electrode 122, but when all the 10 points may not be located in the first internal electrode 121 or the second internal electrode 122, the reference point may be relocated, or the interval between the 10 points may be adjusted.

Dielectric Layer

Zirconium oxide ($ZrO_2$) added to the conductive paste for the internal electrode may be partially diffused into the dielectric layer 111 in the form of Zr through the firing process, and the diffused Zr may be mainly included in the vicinity of the interface the dielectric layer 111 located close to the internal electrodes 121 and 122.

Zr diffused into the vicinity of the interface of the dielectric layer 111 may suppress the grain growth of the dielectric grain located in the vicinity of the interface, and accordingly, as the size of the dielectric grain is decreased, interface reliability between the dielectric layer 111 and the internal electrodes 121 and 122 may be increased.

In addition, by increasing an average particle diameter of the dielectric grains included in a central portion of the dielectric layer 111, a multilayer capacitor having excellent electric characteristics and reliability may be implemented.

Figure 7:
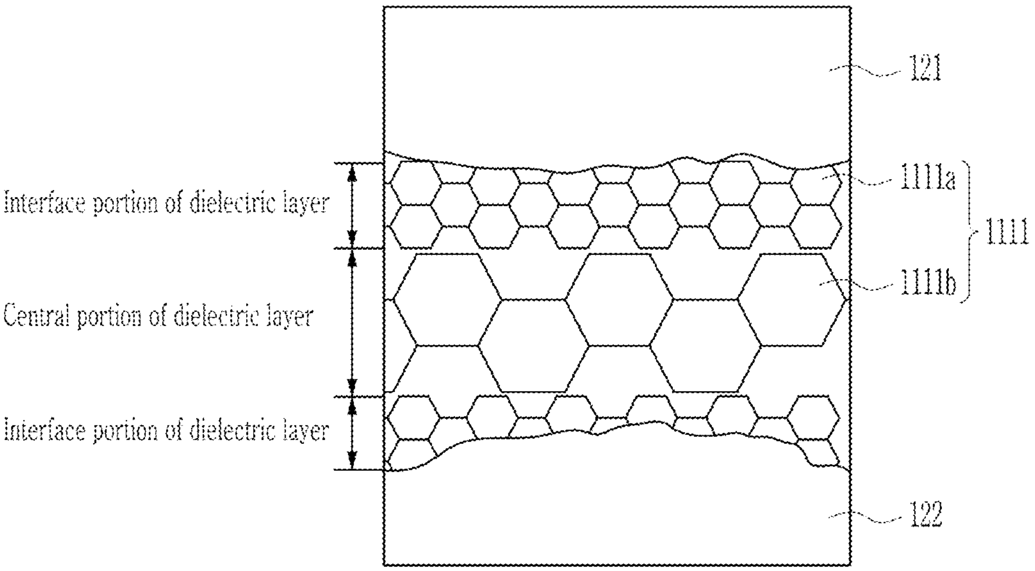
FIG. 7 is a schematic view showing a portion of a cross-section of a multilayer capacitor according to an embodiment.

FIG. 7 is a schematic view showing a portion of a cross-section of the multilayer capacitor 100 according to an embodiment.

Referring to FIG. 7, the dielectric layer 111 may include a plurality of dielectric grains 1111.

A dielectric grain 1111 may include a primary component and a secondary component.

The primary component may be a dielectric base material, have a high dielectric constant, and contribute to forming the dielectric constant of the multilayer capacitor 100.

The primary component may be a dielectric material including $Ba_mTiO_3$($0.995 \leq m \leq 1.010$), $(Ba_{1-x}Ca_x)_m(Ti_{1-y}Zr_y)O_3$($0.995 \leq m \leq 1.010$, $0 \leq x \leq 0.10$, $0 < y \leq 0.20$), $Ba_m(Ti_{1-x}Zr_x)O_3$ ($0.995 \leq m \leq 1.010$, $x \leq 0.10$), $(Ba_{1-x}Ca_x)_m(Ti_{1-y}Sn_y)O_3$ ($0.995 \leq m \leq 1.010$, $0 \leq x \leq 0.10$, $0 < y \leq 0.20$), or a combination thereof.

According to some embodiments, the primary component may include $(Ba_{1-x}Ca_x)_m(Ti_{1-y}Zr_y)O_3$($0.995 \leq m \leq 1.010$, $0 \leq x \leq 0.10$, $0 < y \leq 0.20$), $Ba_m(Ti_{1-x}Zr_x)O_3$($0.995 \leq m \leq 1.010$, $x \leq 0.10$), or a combination thereof.

According to some embodiments, the primary component may include at least one selected from the group consisting of $BaTiO_3$, $Ba(Ti, Zr)O_3$, $Ba(Ti, Sn)O_3$, $(Ba, Ca)TiO_3$, $(Ba, Ca)(Ti, Zr)O_3$, $(Ba, Ca)(Ti, Sn)O_3$, $(Ba, Sr)TiO_3$, $(Ba, Sr)(Ti, Zr)O_3$, $(Ba, Sr)(Ti, Sn)O_3$, and combinations thereof.

The secondary component may include at least one selected from the group consisting of zirconium (Zr), manganese (Mn), chromium (Cr), silicon (Si), aluminum (Al), magnesium (Mg), tin (Sn), antimony (Sb), hafnium (Hf), germanium (Ge), gallium (Ga), indium (In), lanthanum(La), yttrium (Y), actinium (Ac), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), and combinations thereof.

The dielectric layer 111 may further include a ceramic additive, an organic solvent, a binder, a dispersant, or a combination thereof.

Referring to FIG. 7, the dielectric layer 111 may include the central portion and an interface portion on a surface of the central portion and contacting the internal electrodes 121 and 122.

The central portion of the dielectric layer 111 may mean, in a cross-section taken in the W-axis direction and the T-axis direction at the center of the capacitor body 110 in the L-axis direction, a central point between one point on a first side surface of a first one dielectric layer 111 and one point on a second side surface of a dielectric layer 111 located at a shortest distance from the one point. In addition, as well as the central point, it may mean a region within ±30% in the T-axis direction based on the central point.

The interface portion of the dielectric layer 111 is a region other than the central portion of the dielectric layer 111, and the interface disposed between the dielectric layer 111 and may mean a point spaced apart by 100 nm in the T-axis direction from the internal electrodes 121 and 122 toward the central portion of the dielectric layer 111. In addition, as well as the one point, it may mean a region within ±30% in the T-axis direction based on the one point.

Referring to FIG. 5 and FIG. 6, the interface portion of the dielectric layer 111 includes a relatively large amount of Zr diffused from the internal electrode, and the Zr content may decrease toward the central portion of the dielectric layer 111.

In an embodiment, the average content of zirconium (Zr) with respect to the entire interface portion of the dielectric layer 111 may be 0.001 mol % to 10.0 mol %, and for example, may be 0.01 mol % to 10.0 mol %, 0.1 mol % to 10.0 mol %, or 0.1 mol % to 5.0 mol %.

When the average content of zirconium (Zr) with respect to the entire the interface portion of the dielectric layer 111 satisfies the above numerical range, a multilayer capacitor having improved interface reliability may be implemented.

According to some embodiments, the average content of zirconium (Zr) with respect to the entire components in the central portion of the dielectric layer 111 may be 0 mol % to 2.0 mol %, and for example, may be 0 mol % to 1.0 mol %, or 0 mol % to 0.5 mol %.

When the average content of zirconium (Zr) with respect to the entire components of the central portion of the dielectric layer 111 satisfies the above numerical range, a multilayer capacitor having excellent electric characteristics and reliability may be implemented.

The average content of zirconium (Zr) in the interface portion of the dielectric layer 111 and the central portion of the dielectric layer 111 may be measured by the following method.

Arbitrary dielectric layers 111 are selected in the TEM image of the cross-sectional sample by a quantity of 5 or more, and 5 points of equal intervals corresponding to the central portion of the dielectric layer 111 and the interface portion of the dielectric layer 111 are selected. A line-profile quantitative analysis such as FIG. 5 and FIG. 6 may be performed at each selected point to measure the content of Zr, and an arithmetic average value of the measure values may be calculated, such that the average content of zirconium (Zr) in the interface portion of the dielectric layer 111 and the central portion of the dielectric layer 111 may be obtained.

Referring to FIG. 7, the dielectric grain 1111 may include a first dielectric grain 1111*a* located in the interface portion of the dielectric layer 111 and a second dielectric grain 1111*b* located in the central portion of the dielectric layer 111.

According to some embodiments, an average particle diameter of the first dielectric grains may be smaller than an average particle diameter of the second dielectric grains.

According to some embodiments, an average particle diameter of the first dielectric grain 1111*a* may be 50 nm to 200 nm, and may be, for example, 50 nm to 150 nm, or 50 nm to 100 nm.

According to some embodiments, an average particle diameter of the second dielectric grain 1111*b* may be 150 nm to 500 nm, and may be, for example, 200 nm to 500 nm, or 200 nm to 400 nm.

The average particle diameter of the first dielectric grain 1111*a* and the second dielectric grain 1111*b* may be measured as follows.

First, by using a method such as binarizing the TEM image or SEM image of the cross-sectional sample, the boundaries of the dielectric grains (grain boundaries) are identified by differentiating the areas with contrast differences, and the forms of the first dielectric grain 1111*a* and the second dielectric grain 1111*b* may be identified.

5 points of equal intervals corresponding to the central portion of the dielectric layer 111 and the interface portion of the dielectric layer 111 are selected from the TEM image or SEM image, three or more dielectric grains observed at the selected points are selected to measure their particle diameters, the arithmetic average value is derived, and thereby the average particle diameter of the first dielectric grain 1111*a* and the second dielectric grain 1111*b* may be measured.

According to some embodiments, an average thickness of the dielectric layer 111 may be 0.1 μm or more, 0.5 μm or more, or 1.0 μm or more, and may be 5.0 μm or less, or 2.5 μm or less.

The average thickness of the dielectric layer 111 may be measured as follows.

First, a scanning electron microscope image obtained by observing the cross-sectional sample with a scanning electron microscope (SEM) was prepared.

The average thickness of the dielectric layer 111 may be obtained, in the scanning electron microscope (SEM) image of the cross-sectional sample, by taking a central point in the L-axis direction or the W-axis direction of the dielectric layer 111 as a reference point and calculating an arithmetic mean of 10 thicknesses of the dielectric layer 111 at 10 points spaced with predetermined interval from the reference point.

The predetermined interval of the 10 points may be adjusted according to a scale of the scanning electron microscope (SEM) image, for example, 1 μm to 100 μm, 1 μm to 50 μm, or 1 μm to 10 μm.

Herein, the 10 points must be all located within the dielectric layer 111, but when the 10 points are not all located within the dielectric layer 111, the reference point may be relocated, or the intervals of the 10 points may be adjusted.

External Electrode

The first and second external electrodes 131 and 132 are supplied with voltages of different polarities, and are electrically connected to exposed portions of the first and second internal electrodes 121 and 122, respectively.

According to the above configuration, when a predetermined voltage is applied to the first and second external electrodes 131 and 132, charges are accumulated between the first and second internal electrodes 121 and 122. At this time, a capacitance of the multilayer capacitor 100 is proportional to an overlapping area of the first and second internal electrodes 121 and 122 overlapping each other along the T-axis direction in the active region.

The first and second external electrodes 131 and 132 may respectively include first and second connection portions disposed on the third and fourth surfaces of the capacitor body 110 and connected to the first and second internal electrodes 121 and 122, and may also include first and second band portions disposed at each corner where the third and fourth surfaces of the capacitor body 110 and the first and second surfaces or the fifth and sixth surfaces thereof meet.

The first and the second band portions may respectively further extend from the first and second connection portions to the portions of the first and second surfaces or the fifth and sixth surfaces of the capacitor body 110. The first and second band portions may serve to improve adhesion strength of the first and second external electrodes 131 and 132.

For example, the first and second external electrode 131 and 132 are configured to cover the sintered metal layer contacting the capacitor body 110, a conductive resin layer configured to cover the sintered metal layer, and a plating layer configured to cover the conductive resin layer, respectively.

Sintered metal layer may include a conductive metal and glass.

For example, the sintered metal layer may include at least one selected from the group consisting of copper (Cu), nickel (Ni), silver (Ag), palladium (Pd), gold (Au), platinum (Pt), tin (Sn), tungsten (W), and titanium. (Ti), lead (Pb), an alloy thereof, and combinations thereof as the conductive metal, and for example, the copper (Cu) may include a copper (Cu) alloy. When the conductive metal includes copper, a metal other than copper may be included in an amount of less than or equal to 5 parts by mole based on 100 parts by mole of copper.

According to some embodiments, the sintered metal layer may further include glass. In this case, the sintered metal layer may include a composition in which oxides are mixed with glass, and may be for example, at least one selected from a group consisting of silicon oxide, boron oxide, aluminum oxide, transition metal oxide, alkali metal oxide, and alkaline earth metal oxide. The transition metal may be selected from a group consisting of zinc (Zn), titanium (Ti), copper (Cu), vanadium (V), manganese (Mn), iron (Fe), and nickel (Ni), the alkali metal may be selected from a group consisting of lithium (Li), sodium (Na), and potassium (K), and the alkaline-earth metal may be at least one selected from a group consisting of magnesium (Mg), calcium (Ca), strontium (Sr), and barium (Ba).

Optionally, the conductive resin layer is formed on the sintered metal layer, and for example, it may be formed to completely cover the sintered metal layer. Meanwhile, the first and second external electrodes 131 and 132 may not include the sintered metal layer, and in this case, the conductive resin layer may directly contact the capacitor body 110.

The conductive resin layer may extend to the first and second surfaces or the fifth and sixth surfaces of the capacitor body 110, and a length of the region (i.e., the band portion) where the conductive resin layer extends to the first and second surfaces or the fifth and sixth surfaces of the capacitor body 110 may be longer than a length of the region (i.e., the band portion) where the sintered metal layer extends to the first and second surfaces or the fifth and sixth surfaces of the capacitor body 110. That is, the conductive resin layer may be formed on the sintered metal layer and completely cover the sintered metal layer.

The conductive resin layer may include a resin and a conductive metal.

The resin included in the conductive resin layer is not particularly limited as long as it has bondability and impact absorption and may be mixed with conductive metal powder to form a paste. For example, it may include a phenol resin, an acrylic resin, a silicone resin, an epoxy resin, or a polyimide resin.

The conductive metal included in the conductive resin layer may serve to be electrically connected to the first and second internal electrodes 121 and 122 or the sintered metal layer.

The conductive metal included in the conductive resin layer may have a spherical shape, a flake shape, or a combination thereof. That is, the conductive metal may be formed only in a flake shape, only in a spherical shape, or may have a mixed shape of a flake shape and a spherical shape.

Herein, the spherical shape may also include a shape that is not perfectly spherical, and may include a shape in which, for example, a length ratio between a major axis and a minor axis (long axis/short axis) may be less than or equal to 1.45. The flake-type powder means a powder having a flat and elongated shape, and is not particularly limited, but may have, for example, a length ratio between a major axis and a minor axis (long axis/short axis) of greater than or equal to 1.95.

The first and second external electrodes 131 and 132 may further include a plating layer outside the conductive resin layer.

The plating layer may include at least one selected from the group consisting of nickel (Ni), copper (Cu), tin (Sn), palladium (Pd), platinum (Pt), gold (Au), silver (Ag), tungsten (W), titanium (Ti), or lead (Pb), alone and an alloy thereof. For example, the plating layer may include the nickel (Ni) plating layer or the tin (Sn) plating layer, and may have a form in which the nickel (Ni) plating layer and the tin (Sn) plating layer are sequentially stacked or a plating layer, the nickel (Ni) plating layer, and the tin (Sn) plating layer may be sequentially stacked. In addition, the plating layer may include a plurality of nickel (Ni) plating layers and/or a plurality of tin (Sn) plating layers.

The plating layer may improve mountability of the multilayer capacitor 100 with a board, structural reliability, external durability, heat resistance, and equivalent series resistance (ESR).

Manufacturing Method of Multilayer Capacitor

A manufacturing method of a multilayer capacitor according to another embodiment may include, manufacturing a capacitor body including a dielectric layer and an internal electrode, and forming an external electrode outside the capacitor body.

First, manufacturing of the capacitor body will be described.

In the manufacturing process of the capacitor body, a dielectric paste to become a dielectric layer after firing and a conductive paste to become internal electrodes after firing are prepared.

The dielectric paste is prepared, for example, by the following method. The dielectric powder is uniformly mixed by means such as wet mixing, dried, and then heat treated under predetermined conditions, to obtain calcined powder. An organic vehicle or an aqueous vehicle is added to the obtained calcined powder and kneaded to prepare a dielectric paste.

A dielectric green sheet is obtained by forming the obtained dielectric paste into a sheet using a technique such as the doctor blade method. In addition, the dielectric paste may contain additives selected from various dispersants, plasticizers, dielectrics, the secondary component compounds, or glass, if necessary.

The conductive paste for the internal electrode is prepared by kneading conductive powder made of a conductive metal or an alloy thereof with a binder or a solvent. According to some embodiments, the conductive paste for the internal electrode may be prepared by kneading zirconium oxide. The conductive paste for the internal electrode may include ceramic powder (for example, barium titanate powder) as a co-material, if necessary. The co-material may act to suppress sintering of the conductive powder during the firing process.

On the surface of the dielectric green sheet, the conductive paste for an internal electrode is coated in a predetermined pattern by various printing methods such as screen printing or a transfer method. After stacking a plurality of layers of the dielectric green sheets on which internal electrode patterns are formed, the dielectric green sheet laminate is obtained by pressing in the stacking direction. At this time, the dielectric green sheets and internal electrode patterns may be stacked so that the dielectric green sheets may be disposed on the upper and lower surfaces of the dielectric green sheet laminate in the stacking direction.

Optionally, the obtained the dielectric green sheet laminate may be cut into predetermined dimensions by dicing or the like.

In addition, the dielectric green sheet laminate may be solidified and dried to remove the plasticizer, etc. and barrel-polished by using a centrifugal barrel machine or the like after the solidification-drying. In the barrel polishing, the dielectric green sheet laminate is put with a medium and a polishing liquid into a barrel container, and then, the barrel container is applied with rotational motion or vibration to polish unnecessary parts such as burrs and the like generated during the cutting. In addition, after the barrel polishing, the dielectric green sheet laminate is washed with a cleaning solution such as water and the like and dried.

The dielectric green sheet laminate is treated to remove the binder and fired, obtaining the capacitor body.

The binder removal may be performed under conditions appropriately adjusted according to the primary component composition of the dielectric layer or the primary component composition of the internal electrode. For example, the binder removal may be performed by increasing a temperature at 5° C./hr to 300° C./hr and maintaining 180° C. to 400° C. for 0.5 hours to 24 hours. The binder removal may be performed under an air atmosphere or a reducing atmosphere.

The firing treatment may be performed under conditions appropriately adjusted according to the primary component composition of the dielectric layer or the primary component composition of the internal electrode. For example, the firing may be performed at 1200° C. to 1350° C. or 1220° C. to 1300° C. for 0.5 hours to 8 hours or 1 hour to 3 hours. The firing atmosphere may be a reducing atmosphere, for example, an atmosphere in which a mixed gas of nitrogen gas (N2) and hydrogen gas (H2) is humidified. When the internal electrode includes nickel (Ni) or a nickel (Ni) alloy, an oxygen partial pressure under the firing atmosphere may be $1.0\times10^{-14}$ MPa to $1.0\times10^{-10}$ MPa.

After the firing treatment, annealing may be performed, if needed. The annealing is performed for re-oxidizing the dielectric layer, and when the firing is performed under a reducing atmosphere, the annealing may be performed. The annealing may be performed under conditions appropriately adjusted according to the primary component composition and the like of the dielectric layer. For example, the annealing may be performed at 950° C. to 1150° C. for 0 hour to 20 hours by increasing the temperature at 50° C./hour to 500° C./hour. The annealing atmosphere may be a humidified nitrogen gas (N2) atmosphere, and an oxygen partial pressure may be $1.0\times10^{-9}$ MPa to $1.0\times10^{-5}$ MPa.

In the binder removal treatment, the firing treatment, or the annealing treatment, in order to humidify nitrogen gas, mixed gas, or the like, a wetter or the like may be for example, used, wherein a water temperature may be 5° C. to 75° C. The binder removal treatment, the firing treatment, and the annealing treatment may be performed continuously or independently.

Optionally, the third and fourth surfaces of the obtained capacitor body may be surface-treated through sandblasting, laser irradiation, barrel polishing, or the like. This surface treatment may expose the ends of the first and second internal electrodes on the outer surfaces of the third and fourth surfaces, thereby improving the electrical connection of the first and second external and the first and second internal electrodes and easily forming the alloy portion.

Subsequently, a paste for a sintered metal layer may be coated the outer surface of the obtained capacitor body by using external electrodes and then sintered to form a sintered metal layer.

The paste for forming the sintered metal layer may include a conductive metal and glass. The conductive metal and glass are the same as above and will not be repeatedly illustrated. In addition, the paste for forming the sintered metal layer may optionally include the secondary component such as a binder, a solvent, a dispersant, a plasticizer, or oxide powder. For example, the binder may include ethyl cellulose, acryl, butyral, or the like, and the solvent may use an organic solvent such as terpineol, butyl carbitol, alcohol, methylethylketone, acetone, or toluene, or an aqueous solvent.

A method of coating the paste for forming the sintered metal layer on the outer surface of the capacitor body may include various printing methods such as a dip method, or screen printing, and the like, a coating method by using a dispenser, a spray method by using a spray, and the like. The paste for forming the sintered metal layer may be coated on at least the third and fourth surfaces of the capacitor body and optionally, on a portion of the first surface, the second surface, the fifth surface, or the sixth surface where the band portions of the first and second external electrodes are formed.

Thereafter, the capacitor body on which the paste for forming the sintered metal layer is coated is dried, and sintered at a temperature of 700° C. to 1000° C. for 0.1 hour to 3 hours to form the sintered metal layer.

Optionally, on the outer surface of the obtained capacitor body, a paste for forming the conductive resin layer is coated and cured to form a conductive resin layer.

The paste for forming the conductive resin layer may include a resin and optionally, a conductive metal or a non-conductive filler. The conductive metal and the resin are the same as described above and will not be repeated illustrated again. In addition, the paste for forming the conductive resin layer may optionally include the secondary component such as a binder, a solvent, a dispersant, a plasticizer, or an oxide powder. For example, the binder may include ethyl cellulose, acryl, butyral, or the like, and the solvent may use an organic solvent such as terpineol, butyl carbitol, alcohol, methylethylketone, acetone, or toluene, or an aqueous solvent.

For example, a method of forming the conductive resin layer may include dipping the capacitor body 110 into the paste for forming the conductive resin layer to form the conductive resin layer and curing it, screen-printing or gravure-printing the paste for forming the conductive resin layer on the surface of the capacitor body 110, or coating the paste for forming the conductive resin layer on the surface of the capacitor body 110 and then curing it.

Subsequently, a plating layer is formed outside the conductive resin layer.

For example, the plating layer may be formed by a plating method, or may be formed by sputtering or electroplating (electric deposition).

Hereinafter, specific embodiments of the present disclosure are presented. However, the examples described below are only for specifically illustrating or explaining the present embodiment, and the scope of the present disclosure is not limited thereto.

Reference Example

By adding $ZrO_2$ to the conductive paste including Ni such that the same amount of Zr as shown in Table 1 below may be included, the conductive paste for forming the internal electrode according to Reference Example 1 to Reference Example 4 was prepared.

Experimental Example

Figure 8:
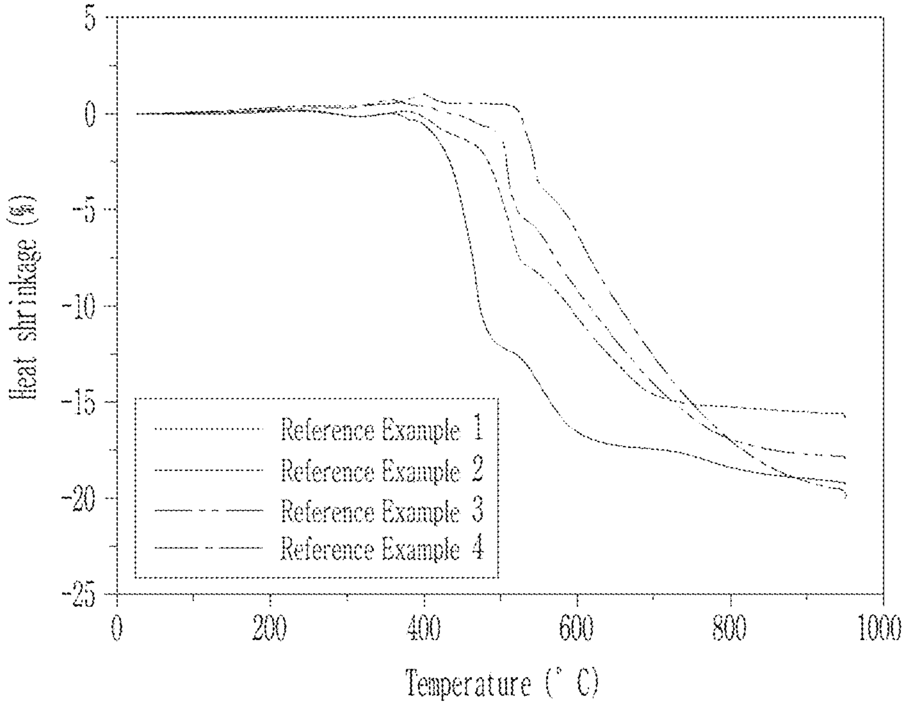
FIG. 8 is a graph showing heat shrinkage rates (%) according to the temperature of the conductive paste prepared in Reference Example 1 to Reference Example 4.

Samples were prepared by processing the conductive paste prepared in Reference Examples 1 to 4 into powder form, and the heat shrinkage rate (%) according to temperature was measured by changing the temperature from 0° C. to 1000° C., and shown in Table 1 and FIG. 8.

Specifically, the measurement was made by using a thermomechanical analyzer (TMA) and with 3% H2 gas at a temperature increase rate of 10K/min.

TABLE 1

| | Zr content (mol %) | Initial shrinkage | 5% shrinkage | 15% shrinkage |
|---|---|---|---|---|
| Reference Example 1 | 0 | 358° C. | 452° C. | 564° C. |
| Reference Example 2 | 0.001 mol % | 402° C. | 508° C. | 735° C. |
| Reference Example 3 | 0.002 mol % | 443° C. | 523° C. | 730° C. |
| Reference Example 4 | 0.05 mol % | 522° C. | 584° C. | 749° C. |

Referring to Table 1, it may be seen that the temperatures at initial shrinkage, 5% shrinkage, and 15% shrinkage are much higher in Reference Examples 2 to Reference Example 4 containing an appropriate amount of Zr compared to Reference Example 1 that does not include Zr. In addition, referring to FIG. 8, it may be confirmed that, at the same temperature, the heat shrinkage rates of Reference Examples 2 to 4 is lower. In conclusion, it may be confirmed that Reference Examples 2 to 4 including an appropriate amount of Zr have higher thermal stability than Reference Example 1.

(EXAMPLES) MANUFACTURING OF MULTILAYER CAPACITOR

Example 1

A slurry for the dielectric material including $BaTiO_3$ was prepared, and a dielectric green sheet was manufactured by using a head discharge type on-roll forming coater on the slurry for the dielectric material.

Subsequently, the conductive paste for internal electrodes was prepared by weighing and mixing Ni and Zr such that the Zr content with respect to the entire internal electrode was 0.001 mol %.

The conductive paste was printed on the dielectric green sheet surface, and the dielectric green sheet (width×depth×height=3.2 mm×2.5 mm×2.5 mm) on which the conductive paste layer was formed is stacked and squeezed, to prepare a dielectric green sheet laminate.

The dielectric green sheet laminate was subjected to a plasticizing process at 400° C. or lower in a nitrogen atmosphere, and then fired at a firing temperature of 1300° C. or lower and a hydrogen concentration of 1.0% H2 or lower, to manufacture a multilayer capacitor according to Example 1.

Examples 2 to 3, and Comparative Examples 1 to 3

Multilayer capacitors of Examples 2 to 3, and Comparative Examples 1 to 3 were manufactured by the same method as Example 1, except that the Zr content with respect to the entire internal electrode was adjusted as shown in Table 2 below.

Evaluation Example

Evaluation Example 1: Evaluation of Electrode Connectivity

The electrode connectivity of the multilayer capacitors manufactured in Examples 1 to 3, and Comparative Examples 1 to 3 was evaluated.

First, after four multilayer capacitors were placed into the epoxy mixture liquid and then cured, side surfaces of the capacitor body 110 in the W-axis direction and the T-axis direction were polished to the ½ point in the L-axis direction, and then by fixing and maintaining it in the vacuum atmosphere chamber, the cross-sectional sample that cut in the W-axis direction and the T-axis direction at the center of the capacitor body 110 in the L-axis direction. Then, the cross-sectional sample was observed with a transmission electron microscope (TEM) (observed at 200× magnification) to prepare a TEM image.

Subsequently, an arbitrary internal electrode was selected, an imaginary line was drawn in the L-axis direction, and the ratio of the unbroken internal electrode length to the total length of the internal electrode was measured.

The relative values of other embodiments and Comparative Examples are described by using the ratio of length measured in Comparative Example 1 as the reference value of 1.

Evaluation Example 2: Evaluation of Electric Characteristics (BDV, Electrostatic Capacitance) and Reliability (MTTF)

The breakdown voltage (BDV), electrostatic capacitance, and MTTF of the multilayer capacitors manufactured in Examples 1 to 3, and Comparative Examples 1 to 3 were evaluated, and the results are shown in Table 2.

In order to measure BDV, sets of 50 multilayer capacitors were prepared, voltage was applied in a sweep manner from 0 V to 1100 V in increments of 1.00000 V by using a Keithley meter 2410 model, and a voltage value at the moment when the current value becomes 20 mA was measured as the breakdown voltage value. The breakdown voltage was measured in a silicone oil bath. By using the BDV of Comparative Example 1 as the reference value of 1, relative values of other embodiments and Comparative Examples are described.

The electrostatic capacitance was measured under the condition of 1 kHZ and AC 0.5V by using an LCR meter, and by using the electrostatic capacitance of Comparative Example 1 as the reference value of 1, relative values of other embodiments and Comparative Examples are described in Table 2.

The mean time to failure (MTTF) value was measured by performing a temperature load test on 400 samples per the embodiments and Comparative Examples under the condition of 125° C. and 8V. At this time, the time when the insulation resistance became 10 kΩ or less was set as the fixed time, the MTTF value of Comparative Example 1 was taken as the reference value of 1, and the relative values of other embodiments and Comparative Examples are described in Table 2.

TABLE 2

| | Zr content (mol %) | Electrode connectivity | Capacity | BDV | MTTF |
|---|---|---|---|---|---|
| Comparative Example 1 | 0.00 | 1 (reference) | 1 (reference) | 1 (reference) | 1 (reference) |
| Example 1 | 0.001 | 1.03 | 1.07 | 1.01 | 1.05 |
| Example 2 | 0.1 | 1.07 | 1.15 | 1.06 | 1.14 |
| Example 3 | 1 | 1.05 | 1.09 | 1.17 | 1.22 |
| Comparative Example 2 | 5 | 0.98 | 0.93 | 1.08 | 1.16 |
| Comparative Example 3 | 10 | 0.87 | 0.80 | 0.94 | 0.91 |

Referring to Table 2, it may be confirmed that, as the Zr content in the internal electrode increased from 0.001 mol % to 1 mol % in Example 1 to Example 3, electrode connectivity increased due to the delay effect of the internal electrode shrinkage, and thereby the capacity also increased.

However, it may be confirmed that, in Comparative Example 2, excessive Zr was diffused into the dielectric layer to suppress the grain growth of the dielectric grain such that the electrode connectivity and the capacity was lowered compared to Comparative Example 1.

In addition, it may be confirmed that, in the case of Example 1 to Example 3, the breakdown voltage (BDV) and the MTTF (reliability) were increased due to an increase of the interface reliability between the dielectric layer and the internal electrode.

However, it may be confirmed that, in the case of Comparative Example 3 in which an excessive amount of Zr was included, the BDV and the MTTF are lowered compared to Comparative Example 1.

While this disclosure has been described in connection with what is presently considered to be practical example embodiments, it is to be understood that the disclosure is not limited to the disclosed embodiments. On the contrary, it is intended to cover various modifications and equivalent arrangements included within the spirit and scope of the appended claims.

DESCRIPTION OF SYMBOLS

100: multilayer capacitor
110: capacitor body
111: dielectric layer
1111: dielectric grain
1111*a*: first dielectric grain
1111*b*: second dielectric grain
112, 113: cover region
121: first internal electrode
122: second internal electrode
131: first external electrode
132: second external electrode

What is claimed is:

1. A multilayer capacitor, comprising:
a capacitor body comprising a dielectric layer and an internal electrode; and
an external electrode disposed outside the capacitor body,
wherein each of the internal electrode and the dielectric layer includes zirconium (Zr), and
wherein an average content of zirconium (Zr) in the internal electrode with respect to an entire component of the internal electrode is 0.0005 mol % or more and less than 1.0 mol %.

2. The multilayer capacitor of claim 1, wherein the internal electrode comprises a conductive metal and zirconium (Zr).

3. The multilayer capacitor of claim 1, wherein:
the dielectric layer comprises a primary component and a secondary component; and
the primary component comprises $(Ba_{1-x}Ca_x)_m(Ti_{1-y}Zr_y)O_3$ ($0.995 \leq m \leq 1.010$, $0 \leq x \leq 0.10$, $0<y \leq 0.20$), $Ba_m(Ti_{1-x}Zr_x)O_3$ ($0.995 \leq m \leq 1.010$, $x \leq 0.10$), or a combination thereof.

4. The multilayer capacitor of claim 1, wherein the average content of zirconium (Zr) in the internal electrode with respect to the entire component of the internal electrode is 0.001 mol % to 1.0 mol %.

5. The multilayer capacitor of claim 1, wherein:
the dielectric layer comprises a central portion in a thickness direction and an interface portion of located on both surfaces of the central portion of the dielectric layer and contacting the internal electrode;
an average content of zirconium (Zr) in the interface portion with respect to an entire component in the interface portion of the dielectric layer is 0.001 mol % to 10.0 mol %; and
an average content of zirconium (Zr) in the central portion with respect to an entire component of the central portion of the dielectric layer is 0 mol % to 2.0 mol %.

6. The multilayer capacitor of claim 5, wherein:
the dielectric layer comprises a plurality of dielectric grains;
the dielectric grain comprises a first dielectric grain located in the interface portion of the dielectric layer and a second dielectric grain located in the central portion of the dielectric layer; and
an average particle diameter of the first dielectric grain is smaller than an average particle diameter of the second dielectric grain.

7. The multilayer capacitor of claim 6, wherein:
the average particle diameter of the first dielectric grain is 50 nm to 200 nm; and
the average particle diameter of the second dielectric grain is 150 nm to 500 nm.

8. The multilayer capacitor of claim 1, wherein an average thickness of the dielectric layer is 0.1 μm to 5 μm.

9. The multilayer capacitor of claim 1, wherein an average thickness of the internal electrode is 0.1 μm to 2 μm.

10. A multilayer capacitor, comprising:
a capacitor body comprising a dielectric layer and an internal electrode; and
an external electrode disposed outside the capacitor body,
wherein the internal electrode comprises a conductive metal and zirconium (Zr),
wherein the dielectric layer comprises $(Ba_{1-x}Ca_x)_m(Ti_{1-y}Zr_y)O_3$ ($0.995 \leq m \leq 1.010$, $0 \leq x \leq 0.10$, $0<y \leq 0.20$), $Ba_m(Ti_{1-x}Zr_x)O_3$ ($0.995 \leq m \leq 1.010$, $x \leq 0.10$), or a combination thereof, and
wherein an average content of zirconium (Zr) in the internal electrode with respect to an entire component of the internal electrode is 0.0005 mol % or more and less than 1.0 mol %.

11. The multilayer capacitor of claim 10, wherein the average content of zirconium (Zr) in the internal electrode with respect to the entire component of the internal electrode is 0.001 mol % to 1.0 mol %.

12. The multilayer capacitor of claim 10, wherein:

the dielectric layer comprises a central portion in a thickness direction and an interface portion located on both surfaces of the central portion and contacting the internal electrode;

the average content of zirconium (Zr) with respect to the entire the interface portion of the dielectric layer is 0.001 mol % to 10.0 mol %; and the average content of zirconium (Zr) with respect to the entire the central portion of the dielectric layer is 0 mol % to 2.0 mol %.

13. The multilayer capacitor of claim 12, wherein:

the dielectric layer comprises a plurality of dielectric grains;

at least one of the plurality of dielectric grain comprises a first dielectric grain located in the interface portion of the dielectric layer and a second dielectric grain located in the central portion of the dielectric layer; and an average particle diameter of the first dielectric grain is smaller than an average particle diameter of the second dielectric grain.

14. The multilayer capacitor of claim 13, wherein:

the average particle diameter of the first dielectric grain is 50 nm to 200 nm; and the average particle diameter of the second dielectric grain is 150 nm to 500 nm.

15. The multilayer capacitor of claim 10, wherein an average thickness of the dielectric layer is 0.1 μm to 5 μm.

16. The multilayer capacitor of claim 10, wherein an average thickness of the internal electrode is 0.1 μm to 2 μm.

* * * * *